Nov. 27, 1928.
R. B. BAGBY
1,693,016
DASHER FOR ICE CREAM FREEZERS
Filed Oct. 24, 1924     2 Sheets-Sheet 2
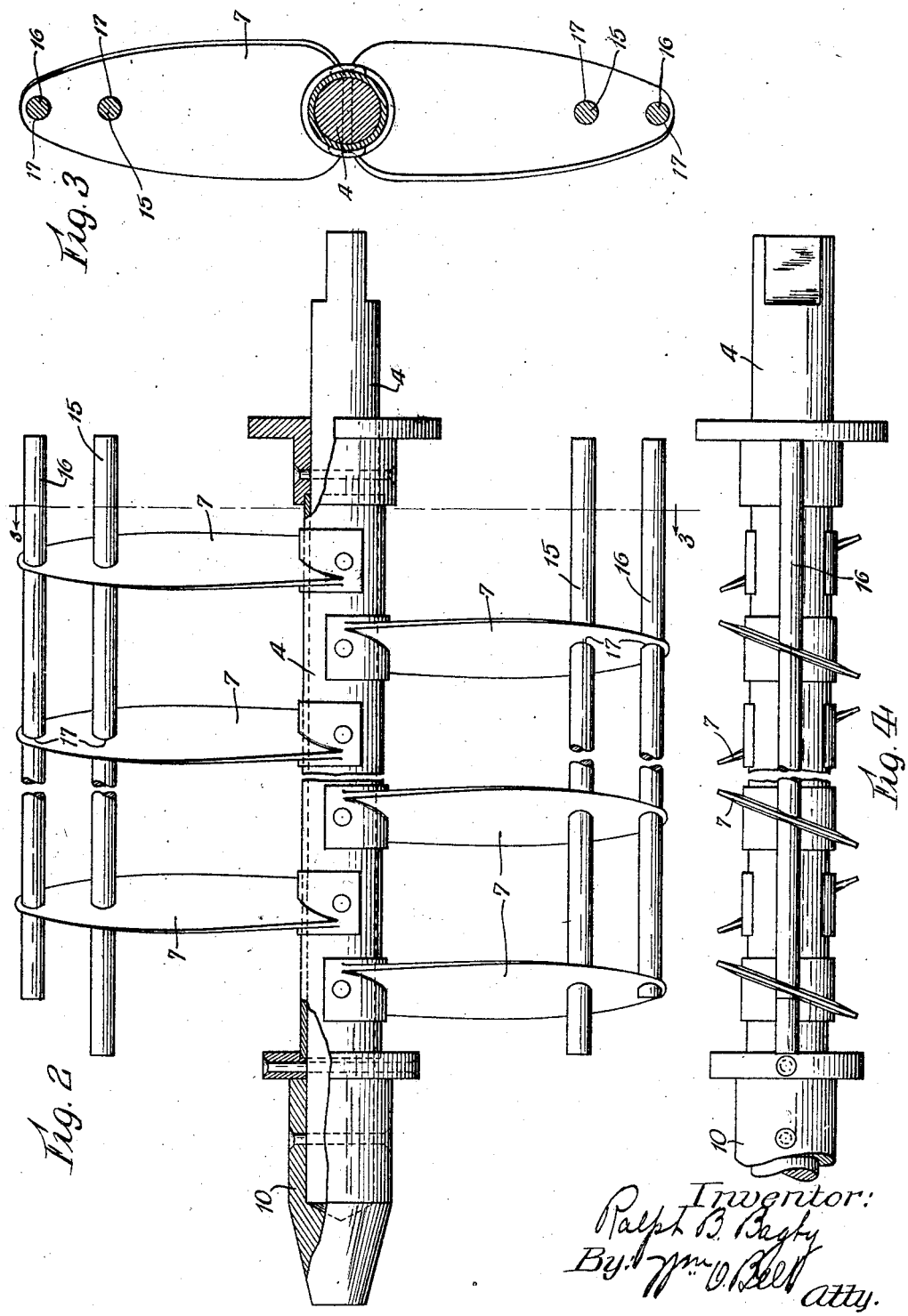

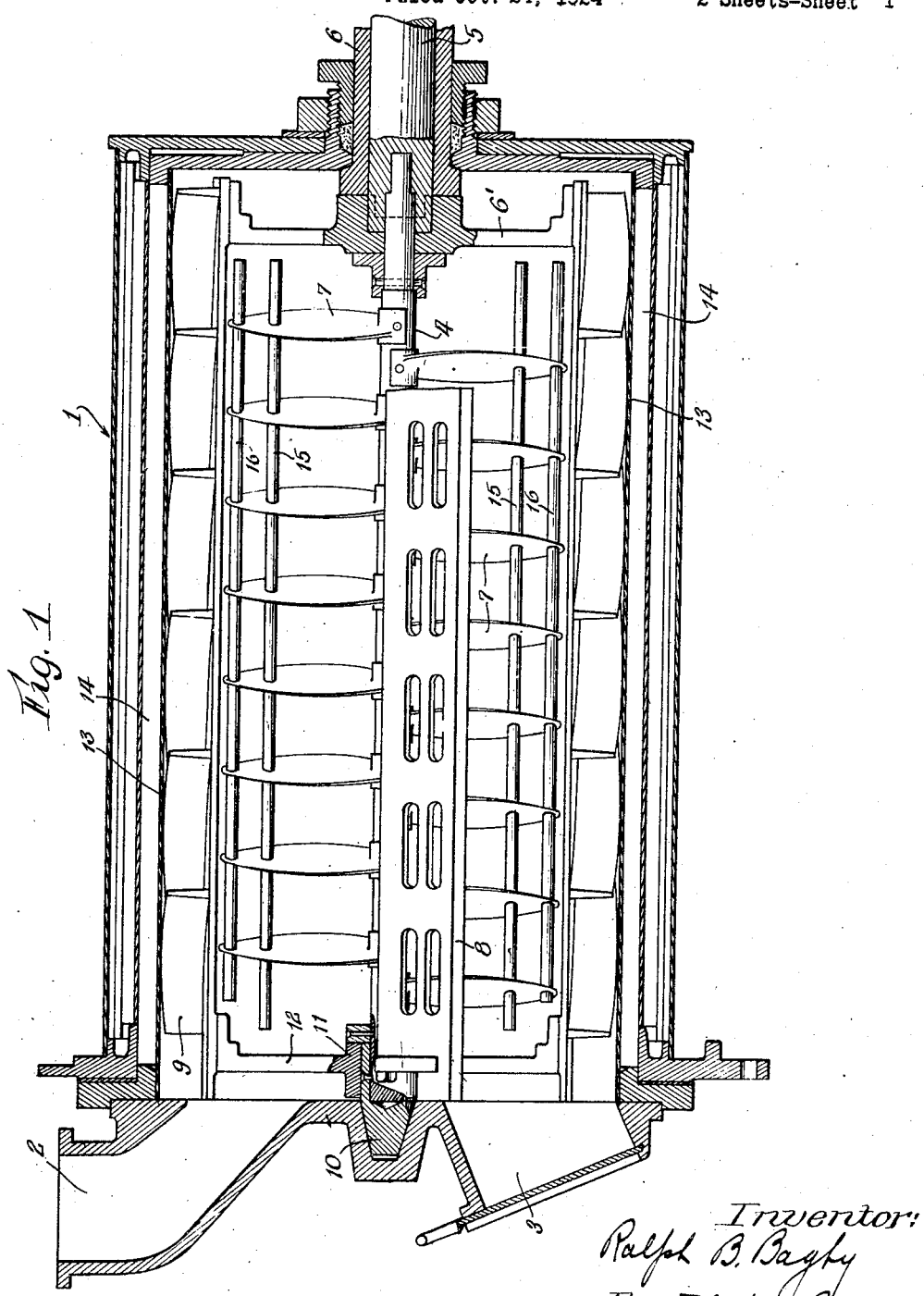

Patented Nov. 27, 1928.

1,693,016

UNITED STATES PATENT OFFICE.

RALPH B. BAGBY, OF CEDAR RAPIDS, IOWA, ASSIGNOR, BY MESNE ASSIGNMENTS, TO CHERRY-BURRELL CORPORATION, OF WILMINGTON, DELAWARE, A CORPORATION OF DELAWARE.

DASHER FOR ICE-CREAM FREEZERS.

Application filed October 24, 1924. Serial No. 745,562.

This invention relates to a novel and improved dasher for ice cream freezers and the like, and has for its principal object a dasher which will increase the overrun or swell of the mixture, and improve the quality thereof.

A further object is to provide a dasher which will materially cut down the time necessary to mix and freeze a batch of ice cream or the like.

In the accompanying drawings in which I have illustrated a selected embodiment of my invention—

Fig. 1 is a horizontal sectional view through a freezer having my invention applied thereto.

Fig. 2 is an enlarged detail elevation of my improved dasher, the scraper blades being omitted for the sake of clearness.

Fig. 3 is a section on the line 3—3 of Fig. 2.

Fig. 4 is a plan view of Fig. 2.

Referring now to the drawings, the numeral 1 designates any suitable freezer for ice cream or the like, and in this illustration I have shown a freezer of the horizontal type, wherein the mixture to be frozen is poured in through the opening 2 and after being frozen is drawn off through the opening 3. The freezer has mounted longitudinally thereof a shaft 4 suitably connected to a shaft 5 extending into one end of the freezer and surrounded by a sleeve 6. The shaft 4 has mounted thereon beater blades 7 and scraper blades 8. These scraper blades 8 may be of any well-known construction. The sleeve 6 is provided with a spider 6' to support a plurality of unloading wings 9 arranged longitudinally of the freezer as shown in Fig. 1. The left hand end of the shaft 4 (Fig. 1) is supported in a suitable bearing 10 and surrounding said bearing is the hub 11 of a second spider 12 which, with the spider 6', supports the unloading wings 9. The shaft 5 and sleeve 6 are connected to suitable driving devices exteriorly of the freezer, which cause these members 5 and 6 to revolve in opposite directions in a manner well-known in the art.

As the shaft 5 and sleeve 6 rotate in opposite directions the mixture which has been admitted to the freezer is beaten by the blades 7 and thrown out by centrifugal force against the wall 13 of the freezer. As is well-known in the art, the wall 13 is surrounded by brine circulating in a suitable chamber 14 whereby the mixture which comes in contact with the wall 13 becomes frozen, and is then scraped off by the scraper blades 8 and also by the unloading wings 9, and thrown back into the unfrozen mixture. After this process has been repeated a sufficient length of time, the entire mixture is frozen to a proper consistency and then the outlet 3 is opened to draw the mixture off, the mixture being forced out of the outlet 3 by the unloading wings 9, which are inclined at a proper angle to achieve this result.

The above described operation is broadly old. The function of the blades 7 is to whip and beat the mixture in order to admit air thereto during freezing. This beating action results in an increase of volume which is very desirable. I have found that by supplementing the beating action of the blades with additional beaters the time required to incorporate the desired amount of air, or overrun as it is called, is materially reduced. A reduction in the time required to beat in the overrun results in an improvement in the quality of the product.

I have exemplified my supplemental beating means by rods 15 and 16. These rods may conveniently be passed through apertures 17 in the beater blades, and may be conveniently secured thereto by any suitable means, such as solder. While these rods may vary in number and location, I find that excellent results are achieved by employing two of them, one of which is placed substantially at the outer end of the blades, and the other is placed inwardly therefrom. It will be seen that the combined blades and rods will give not only a churning action, due to the blades, but will also give a beating action, due to the rods. That is, the blades 7, being inclined to the axis to the shaft in the usual way, tend to move the mixture toward one end of the freezer and perform a churning action thereon, and during this movement of the mixture it is beaten by the rods 15 and 16, which tend to give it movement in a circular direction within the freezer. At the same time, of course the entire mixture is being thrown outwardly by centrifugal force, as usual.

When a round rod travels through ice cream mix the skin friction of the mix on the rod effects a swirling action behind and at both sides of the center line of the rod, instead of being thrown forward and away from the rod, and this swirling action produces air pockets at the back of the rod and enfolds the air in the mix. I prefer to use pairs of rods in or about the manner shown for the following reasons;—It is the practice to fill the freezer about one-half full of mix and when the dasher is operated the mix is thrown against the wall of the freezer where freezing commences. Within the cylinder formed by the mix during the operation of the dasher, there is more or less a core of air and the outer rod travels approximately where the cylinder of mix and core of air join. As the air is whipped into the mix the natural swell of freezing takes place, the cylinder of frozen mix increases in thickness and the air core decreases in diameter, so that the inner rod travels at or about where the core and mix join. Both rods of a pair operate at the same time but the outer rod performs its principal work during the early part of the freezing action and the inner rod performs its principal work during the latter part of the freezing action.

From the above it will be apparent that I have provided a novel and improved dasher for ice cream freezers and the like which will involve slight expense to apply to existing dashers, but which will materially increase the output thereof.

I am aware that changes in the form, construction and arrangement of parts may be made without departing from the spirit and without sacrificing the advantages of the invention and I reserve the right to make all such changes as fairly fall within the scope of the following claims.

I claim:

1. In an ice cream freezer, a revoluble dasher comprising a shaft, a plurality of independent angularly disposed beater blades projecting radially of the shaft and arranged in series extending lengthwise of the shaft to move a mixture longitudinally of the dasher, each series of blades having a round section rod extending therethrough and spaced from the shaft.

2. In an ice cream freezer, a revoluble dasher comprising a shaft, a plurality of independent angularly disposed beater blades projecting radially of the shaft and arranged in series extending lengthwise of the shaft to move a mixture longitudinally of the dasher, each series of blades having one rod extending therethrough adjacent the outer ends of the blades and another rod extending therethrough between the first mentioned rod and the shaft.

RALPH B. BAGBY.